United States Patent
Holste et al.

[11] Patent Number: 6,121,572
[45] Date of Patent: Sep. 19, 2000

[54] FIXTURE USED FOR THE HEAT SEALING OF FOILS USING A PLASMA JET

[75] Inventors: Ralf Holste, Halle; Ansgar Jahn, Bad Iburg; Peter Förnsel, Spenge; Christian Buske, Steinhagen, all of Germany

[73] Assignee: Raantec Maschinenbau-und Metalltechnik GmbH, Germany

[21] Appl. No.: 09/308,564

[22] PCT Filed: Sep. 3, 1998

[86] PCT No.: PCT/EP98/05591

§ 371 Date: Jun. 21, 1999

§ 102(e) Date: Jun. 21, 1999

[87] PCT Pub. No.: WO99/16572

PCT Pub. Date: Apr. 8, 1999

[30] Foreign Application Priority Data

Sep. 26, 1997 [DE] Germany ............ 197 42 442

[51] Int. Cl.[7] ............................................. B23K 10/00
[52] U.S. Cl. .......................... 219/121.59; 219/121.45; 219/121.46; 219/121.37
[58] Field of Search ............................ 219/121.5, 121.59, 219/121.45, 121.46, 121.37, 121.36; 428/461, 462, 483, 500; 156/646.1, 643.1

[56] References Cited

U.S. PATENT DOCUMENTS

| | | |
|---|---|---|
| 2,975,263 | 3/1961 | Green et al. |
| 3,959,567 | 5/1976 | Bradley ............................ 428/461 |
| 4,282,418 | 8/1981 | Wuestner ......................... 219/121.5 |
| 4,345,137 | 8/1982 | Mignier et al. ................. 219/121.48 |

FOREIGN PATENT DOCUMENTS

| | | |
|---|---|---|
| 0691173 | 1/1996 | European Pat. Off. |
| 3216556 | 11/1983 | Germany. |
| 3713527 | 11/1988 | Germany. |
| 4219619 | 1/1994 | Germany. |
| 19532412 | 3/1997 | Germany. |

Primary Examiner—Mark Paschall
Attorney, Agent, or Firm—Rothwell, Figg, Ernst & Manbeck, p.c.

[57] ABSTRACT

Fixture for the heat-sealing of foils along a weld joint, including a plasma nozzle (10) and a conveying device which generates a relative movement between the plasma nozzle and the foil layers (42, 44) along the weld joint.

21 Claims, 3 Drawing Sheets

FIXTURE USED FOR THE HEAT SEALING OF FOILS USING A PLASMA JET

BACKGROUND OF THE INVENTION

1. Field of the Invention

The invention concerns a procedure and a fixture for the heat sealing (jig welding) of foils along a weld joint or seal.

2. Description of the Background Art

Common fixtures of this kind, which are used in the packing industry to close foil bags, for example, are usually equipped with a sealing jaw that can be raised and lowered, extending crosswise over a conveying path on which the foil bags that are to be sealed are moved forward gradually. During each step of the process, the sealing jaw is lowered briefly onto the overlapping foil sheets that are to be sealed, and with the help of a resistance wire, or similar component, that runs in the sealing jaw in a longitudinal direction, the foils are heated briefly on the weld joint so that they are welded together or heat-sealed and, if desired, separated at the same time.

One disadvantage of these common fixtures consists of the fact that both the movable sealing jaws and the conveying device for the foil bag have to be moved gradually in cycle sequences that are adjusted to each other. With every work cycle a considerable amount of inert mass has to be accelerated and then slowed down again. This requires complex drive and control mechanisms. The dimensions of this fixture, overall mass of the movable parts, minimum lift of stroke of the sealing jaw and step size of the conveying device all increase with increasing packing size so that great design efforts are required, particularly when packaging larger size items, and only low productivity levels can be achieved due to correspondingly long cycle times.

Another disadvantage of common fixtures is the direct contact of resistance wires with the foil, easily causing operating failures due to contamination or the caking of foil material onto the sealing jaw. Particularly in the case of relatively long weld seams it is also very difficult to ensure even temperatures and contact pressures over the entire length of the sealing jaw and to obtain a weld joint of consistently good quality.

SUMMARY OF THE INVENTION

Therefore the object of the invention consists in creating a procedure and a fixture for heat-sealing foils, especially plastic foils, which excel due to their low susceptibility to interference and low design efforts and which enable high productivity.

This object is realized with a procedure of the kind described above by heat-sealing the foils with the help of a plasma jet. A fixture suited for this process is equipped with a plasma nozzle and a conveying device that generates a relative movement between the plasma nozzle and the foil layers along the weld joint. Thus, the fixture is equipped for executing a procedure during which the foil layers are heat-sealed with each other with the help of a plasma jet that moves along the weld joint.

Since the sealing process occurs without contact, i.e. without direct contact between the foil sheets and the plasma nozzle, the fixture is not prone to failures, and the sealing process is relatively tolerant towards slight changes in the distance between the foil layers and the plasma nozzle. This makes it possible to achieve high weld joint quality, even in the case of longer weld joints.

Since the plasma jet can be very hot and therefore needs to act on the foil material only for a very short period, the plasma nozzle can be moved along the weld joint at high speed, thus achieving high productivity. The plasma nozzle itself is of a very compact and very simple design as well as being lightweight, so that it can be moved along the weld joint without difficulty.

Advantageous designs and versions of the invention are described below.

When a straight weld joint needs to be generated, the plasma nozzle is preferably stationary and the foils that are to be sealed are moved by the plasma nozzle with a conveying device, thus generating a weld joint that runs parallel to the conveying device. The conveying device can therefore be driven at a constant speed so that practically no moveable parts have to be shifted back and forth and no complex cycle controls are required. The foil layers that are to be sealed can be pressed against each other with pressure rollers, for example, which are installed on the conveying device on both sides of the stationary plasma nozzle.

If the weld joint runs cross-wise to the conveying direction, as is the case with common fixtures, the plasma nozzle could be moved back and forth with a chain. The plasma nozzle would then alternately move from right to left and from left to right during successive operating cycles. The chain would also enable the plasma nozzle to be redirected into moving along a U-shaped path and sealing a foil sheet that is folded on one side on the three remaining sides. With a fixture of this design even large items, such as fabric rolls or carpeting, can be heat-sealed into foil reliably and efficiently.

BRIEF DESCRIPTION OF THE DRAWINGS

The following explains preferred versions of the invention in greater detail with the help of drawings.

They show.

DETAILED DESCRIPTION OF THE INVENTION

Figure 1:
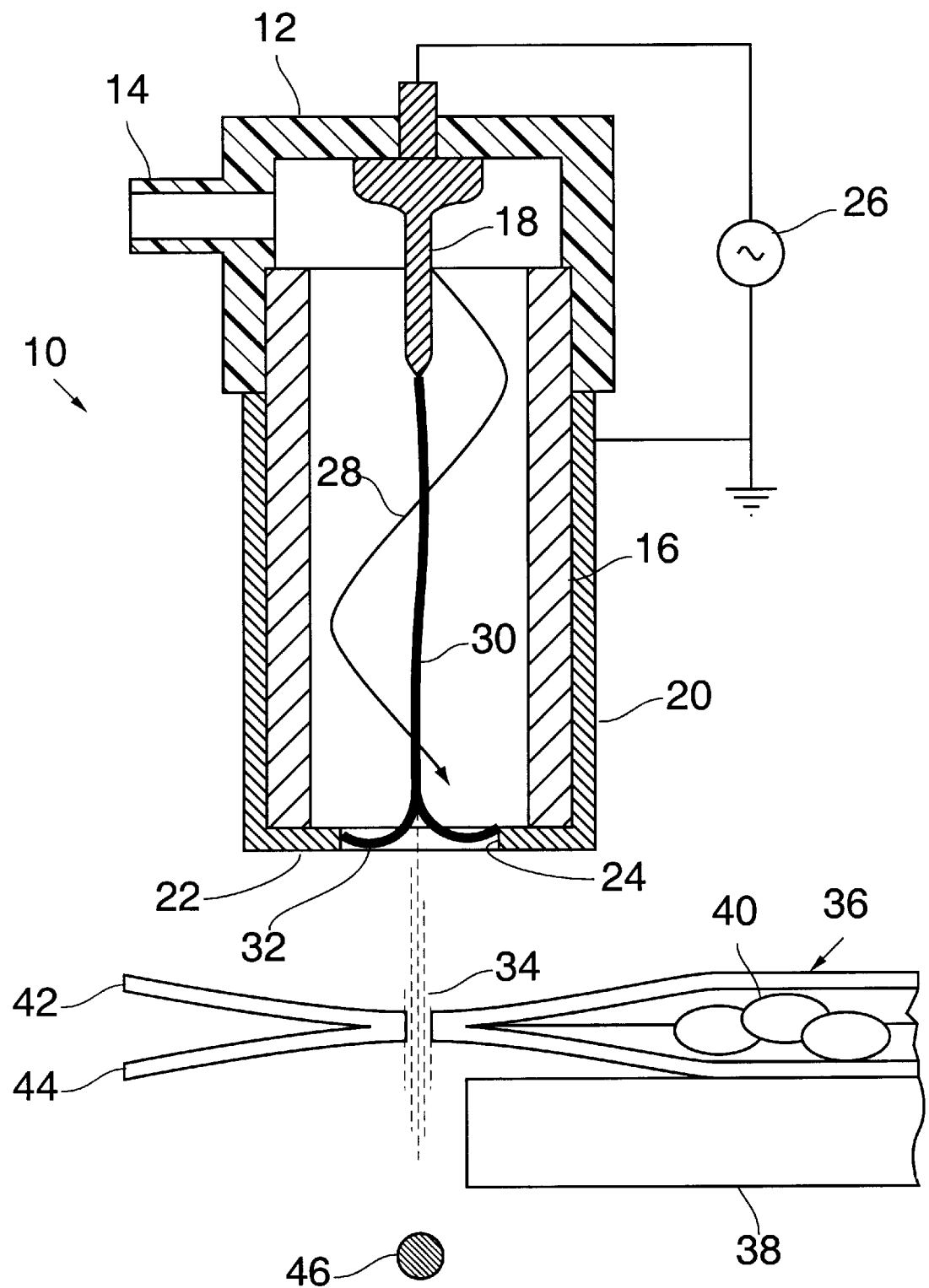
FIG. 1 a diagrammatic view through a foil heat-sealing device in accordance with a first version.

A major component of the fixture is a plasma nozzle 10, whose set-up and function are to be explained more in detail with FIG. 1.

In the example shown, the plasma nozzle 10 has a design known from DE 195 32 412 A1.

The plasma nozzle 10 has a pot-shaped housing 12 made of plastic, which is equipped with a connection 14 on the side so as to be able to feed a working gas. In the opening of the housing 12, a nozzle pipe 14 made of ceramics is fastened co-axially. A copper pin electrode 18, whose tip reaches into the nozzle pipe 16, is arranged in the center of the interior of the housing 12. Outside the housing 12, the outer circumference of the nozzle pipe is surrounded by an electroconductive shell 20 that forms an annular electrode 22 at the free end of the nozzle pipe 16. The annular electrode 22 limits a nozzle opening 24, whose diameter is slightly smaller than the interior diameter of the nozzle pipe 16 so that a certain degree of constriction is achieved at the outflow of the nozzle pipe.

The shell 20 and thus also the annular electrode 22 are grounded, and with the help of a high frequency oscillator 26 alternating voltage—whose electric potential can be controlled and is about 5 to 30 kV during operation of the plasma nozzles—of a frequency of about 20 kHz is applied between this annular electrode and the pin electrode 18.

The connection 14 for the working gas is arranged eccentrically with regard to the housing 12 so that the gas that is fed flows through the nozzle pipe 16 in a swirled shape, as indicated with the arrow 28 in FIG. 1. Supported by the constriction at the outflow of the nozzle pipe, a stable gas swirl is formed whose vortex core extends along the axis of the nozzle pipe.

The electroconductive shell 20 extends approximately up to the height of the tip of the pin electrode 18 on the end located on the housing side. When increasing the electric potential, a corona discharge is formed initially at the tip of the pin electrode 18. The bluish discharge bundles extend radially to the wall of the nozzle pipe 16, and the carrier is transported to the shell 20 through the ceramic material of the nozzle pipe 16. This corona discharge supplies the necessary ions with which an arc discharge from the pin electrode 18 to the annular electrode 22 is ignited as the electric potential increases. When using air as the working gas, a white-blue electric arc 30 is formed, which extends from the tip of the pin electrode 18 in a thin, clearly limited channel along the axis of the nozzle pipe 16 to approximately the center of the opening 24. Only then is the electric arc split into several partial branches 32 leading radially to the annular electrode 22. The point where the axial electric arc 30 splits into individual partial branches 32 simultaneously forms the origin of plasma jet 34, which is of a light golden color when using air as the working gas.

In the example shown, the nozzle pipe 16 has an inside diameter of about 8 mm (0.31 inch), and the axial distance between the tip of the pin electrode 18 and the nozzle opening 24 is about 55 mm (2.17 inches). The inside diameter of the nozzle opening 24 is about 5 mm (0.20 inch). By increasing the distance between the pin electrode and the nozzle opening 24, bundling of the plasma jet can be improved, and thus the temperature can be increased. The constriction on the nozzle opening 24 also appears to have a favorable effect on the bundling of the plasma jet.

When increasing the throughput of the working gas through the nozzle pipe 16, the origin of the plasma jet is shifted further outward, i.e. towards the work piece, and the flame becomes longer and narrower. At the same time, the outward curvature of the radial branches 32 of the electric arc—which can be seen in FIG. 1—increases. However, when reducing the flow of the working gas, or shutting it off completely, the axial electric arc 30 expands until it finally fills in nearly the entire interior area of the nozzle pipe. The plasma jet 34 becomes shorter, and its origin is no longer dot-shaped, but rather distributed over the cross-section of the nozzle opening 24. During moderate gas throughput, it is noticeable that the electric arc 30 within the nozzle pipe follows the swirl-shaped flow of gas. When increasing the gas throughput gradually, the electric arc 30 is increasingly compressed in radial direction and fixed on the axis of the nozzle pipe. The electric arc 30 therefore appears to be channelized by the core of the gas swirl. Due to this effect, a very stable and hot plasma jet 34 can be obtained with sufficiently high gas throughput, which starts at a dot-shaped point of origin immediately before the center of the opening 24.

In the version shown in FIG. 1, the fixture serves the purpose of heat-sealing foil bags 36, which are passed by the plasma nozzle 10 with the help of a conveying device 38. The conveying device 38 here is shown as an conveying belt, which runs continuously in a direction that is vertical to the drawing plane of FIG. 1. The foil bags 36, which have already been filled with their respective contents 40, are arranged on the conveying belt in FIG. 1 in such a way that their open sides protrude to the left over the rim of the conveying belt. The plasma nozzle 10 is stationary over the conveying device 38 and positioned in such a way that the plasma jet 34 is released vertically downward right next to the rim of the conveying belt and meets with the flat, superimposed upper and lower foil layers 42, 44 of the foil bag. Beneath the foil bag 36, a grounded collector electrode 46 is arranged opposite the plasma nozzle 10.

The tightly bundled plasma jet 34 generated by the plasma nozzle 10 has such a high temperature that it cuts through the superimposed foil layers 42, 44 and at the same time heat-seals its edges. The conveying speed of the conveying device 38 is adjusted in such a way that the plasma jet 34 just barely cuts the foil layers 42, 44. When foil bags 36 are run under the plasma nozzle 10 continuously, their openings are heat-sealed and the ends of the foil layers 42, 44, which are shown to protrude to the left in FIG. 1, are separated by the plasma jet 34. Electric charges contained in the plasma jet 34 are gathered by the collector electrode 46 and diverted. The collector electrode 46, which for example can be a thin wire, contributes to the stabilization of the tightly focused plasma jet 34.

Figure 2:
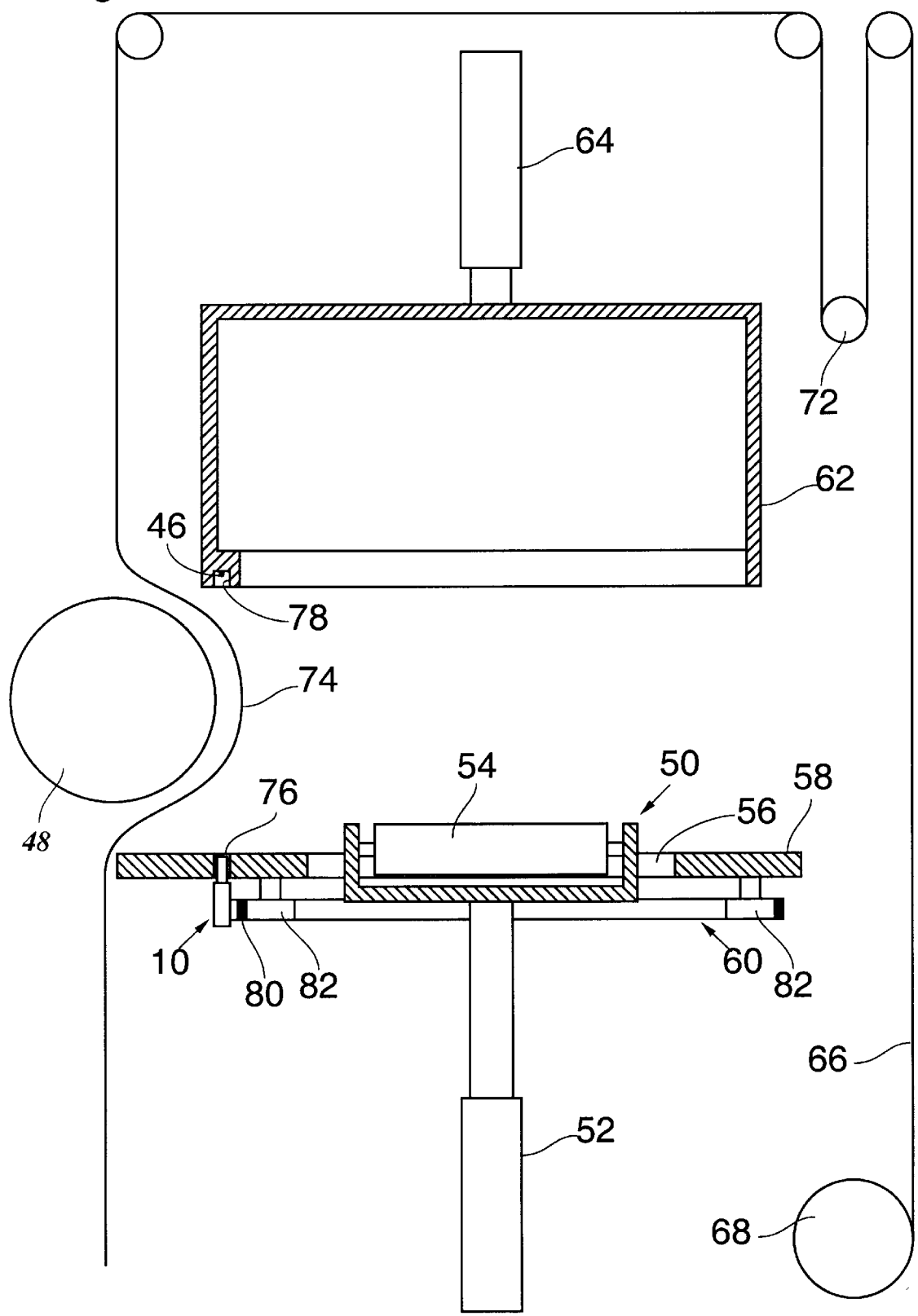
FIG. 2 a diagrammatic view through a fixture in accordance with a second version.

FIG. 2 shows another version of a fixture, with which large items, such as fabric rolls 48, can be heat-sealed in foil.

A roller table 50, which serves the purpose of holding the fabric roll in place during the heat-sealing process and is height-adjustable, is arranged at the upper end of a lifting frame 52 and equipped with conveying rollers 54, with which it can transport finished, heat-sealed fabric rolls 48 in the direction that is vertical to the drawing plane in FIG. 2. In the state shown in FIG. 2, the roller table 50 is located in a window 56 of a stationary frame 58, beneath which a conveying device 60 for the plasma nozzle 10 is fastened.

Above the frame 58, a dome-shaped pressure pad 62 is arranged, which is height-adjustable and is suspended in another lifting frame 64.

One foil sheet 66 is pulled off a foil spool 68 and guided to the feeding side of the fixture (left in FIG. 2) via a compensating system 70 to the tensile stress control mechanism over the pressure pad 62 and the lifting frame 64. Before the fabric roll 48 is fed, the foil sheet 66 forms a freely sagging curtain on the feeding side, whose lower end could be held in place, if required, with an exhauster (not shown). When introducing the fabric roll 48 into the space between the frame 58 and the pressure pad 62, the sagging foil sheet 66 is folded in so that it forms a pocket 74.

The frame 58 is equipped with a slit 76 into which the plasma nozzle 10 reaches from below. This slit surrounds the window 56 on three sides, i.e. from the left, front and back, in FIG. 2. A groove 78 is incorporated into the lower rim of the pressure pad 62 on these three sides, which is located opposite the slit 76 along its entire length and at the base of which runs the collector electrode 46.

The conveying device 60 is formed by a circumferential chain 80, on which the plasma nozzle 10 is fastened and which is guided over deflection rollers 82 in such a way that with them the plasma nozzle 10 can be moved along the slit 76.

Starting with the state depicted in FIG. 2, the fabric roll 48 is inserted deeper into the fixture and placed on the roller table 50. The pocket 74 completely encloses the fabric roll 48 so that two foil layers are arranged immediately on top of each other in the area of the slit 76.

With the lifting frame 52 the roller table 50 is lowered until the center of the fabric roll 48 is located approximately at the height of the upper surface of the frame 58. This minimizes a bulging of the foil layers.

Figure 3:
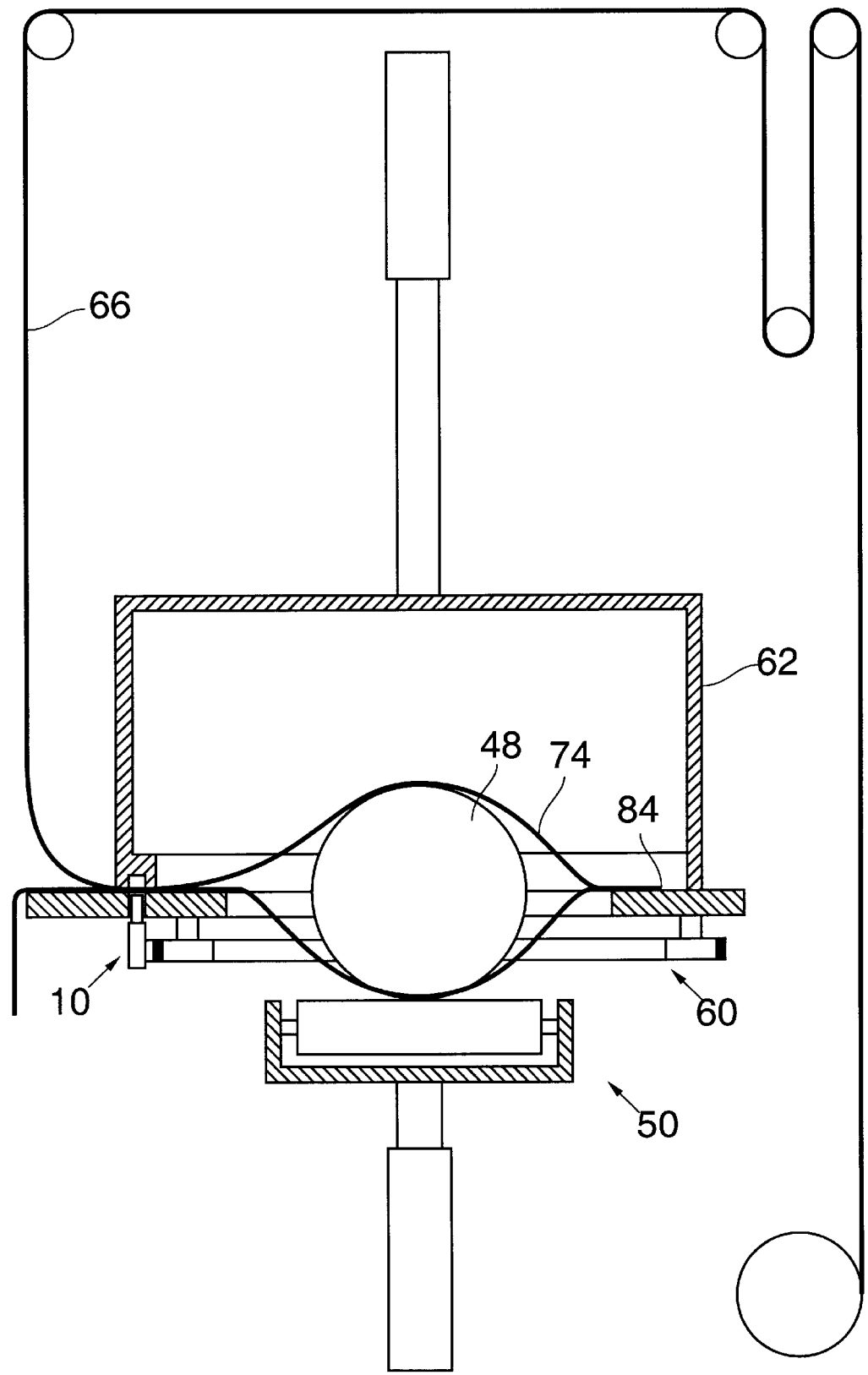
FIG. 3 the fixture according to FIG. 2 in a different operating condition.

As shown in FIG. 3, the pressure pad 62 is then lowered onto the frame 58. This way the two foil layers of the pocket 74 are clamped between the frame 58 and the pressure 62 on the three sides where the slit 76 and the groove 78 are located and pressed slightly against each other. On the fourth side, the two foil layers of the pocket 74 then form a pleat 84, which is located within the pressure pad 62.

The plasma nozzle 10 is initially located on one end of the slit 76 in a position between the pleat 84 and the inside wall of the pressure pad 62. The plasma nozzle is then moved to the opposite end of the slit 76 with the conveying device 60 so that the two foil layers of the pocket 74 are heat-sealed by the plasma jet. The fabric roll 48 is then surrounded by the weld joint on three sides and the pleat 84 on the fourth side and is therefore completely sealed in foil.

The pressure pad 62 is then lifted again, the roller table 50 is placed back into the position shown in FIG. 2, and the heat-sealed fabric roll 48 is rolled out of the fixture with the help of the transport rollers 54.

During the next work cycle, the heat-sealing process of the next fabric roll 48, the plasma nozzle 10 is moved back again through the slit 76 into its original position.

What is claimed is:

1. Process for heat-sealing foils along a welded joint, wherein a first foil layer is superimposed over a second foil layer, the superimposed layers having opposite outer sides, and wherein the foil layers are heat-sealed with a plasma jet by application of the plasma jet to only one side of the superimposed layers, wherein said plasma jet is moved across said only one side of said superimposed layers to form a welded joint between said superimposed layers.

2. The process of claim 1 utilizing a plasma nozzle and a conveying device which generates a relative movement between the plasma nozzle and the foil layers along the weld joint.

3. The process of claim 2 wherein the plasma nozzle is equipped with an annular electrode through which a working gas flows and a pin electrode that is arranged co-axially to the annular electrode and having a tip which is recessed compared to the annular electrode in a direction that the working gas flows, that the pin electrode is enclosed at a distance by an electrically insulating nozzle pipe that forms a flow channel for the working gas, and that a swirling device is provided which causes a swirl-shaped flow of the working gas through the nozzle pipe.

4. The process of claim 2 wherein the conveying device passes the foil layers that are to be sealed continuously past the stationary plasma nozzle.

5. The process of claim 2 wherein the conveying device is equipped with a flexible conveying component on which the plasma nozzle is fastened and with which the plasma nozzle can be moved relative to the foil layers along a non-rectilinear path.

6. The process of claim 5 wherein the conveying component is a chain or a continuous loop that is guided via deflection rollers.

7. The process of claim 6 wherein the conveying device is mounted on a frame which is equipped with a slit which matches a movement path of the plasma nozzle and into which the plasma nozzle reaches.

8. The process of claim 7, utilizing a pressure pad which can be placed against the frame from a side that is opposite that of the conveying device and which has a groove opposite the slit.

9. The process of claim 7, utilizing a table that is adjustable in height and arranged in a window of the frame and onto which an item that is to be heat-sealed into the foil is placed.

10. The process of claim 7 wherein the slit is U-shaped and that the foil layers that are to be sealed comprise a continuous sheet, which forms a curtain on a side of the fixture that runs parallel to the base leg of the U-shaped slit and from which a packing item is fed into the fixture.

11. The process of claim 1 wherein a grounded collector electrode is arranged opposite the plasma nozzle or opposite a movement path of the layers.

12. Fixture for heat-sealing foils along a welded joint wherein a first foil layer is superimposed over a second foil layer, the superimposed layers having opposite outer sides, and wherein the foil layers are heat-sealed with a plasma jet by application of the plasma jet to only one side of the superimposed layers, wherein said plasma jet is moved across said only one side of said superimposed layers to form a welded joint between said superimposed layers, said fixture including a plasma nozzle and a conveying device, which generates a relative movement between the plasma nozzle and the foil layers along the weld joint.

13. Fixture according to claim 12, characterized in that the plasma nozzle is equipped with an annular electrode through which a working gas flows and a pin electrode that is arranged co-axially to the annular electrode and having a tip which is recessed compared to the annular electrode in a direction that the working gas flows, that the pin electrode is enclosed at a distance by an electrically insulating nozzle pipe that forms a flow channel for the working gas, and that a swirling device is provided which causes a swirl-shaped flow of the working gas through the nozzle pipe.

14. Fixture according to claim 12, characterized in that the conveying device passes the foil layers that are to be sealed continuously past the stationary plasma nozzle.

15. Fixture according to claim 12, characterized in that the conveying device is equipped with a flexible conveying component on which the plasma nozzle is fastened and with which the plasma nozzle be moved relative to the foil layers along a non-rectilinear path.

16. Fixture according to claim 15, characterized in that the conveying component is a chain or a continuous loop that is guided via deflection rollers.

17. Fixture according to claim 16, characterized in that the conveying device is mounted on a frame which is equipped with a slit which matches a movement path of the plasma nozzle and into which the plasma nozzle reaches.

18. Fixture according to claim 17, characterized by a pressure pad which can be placed against the frame from a side that is opposite that of the conveying device and which has a groove opposite the slit.

19. Fixture according to claim 17, characterized by a table that is adjustable in height and arranged in a window of the frame and onto which an item that is to be heat-sealed into the foil is placed.

20. Fixture according to claim 17, characterized in that the slit is U-shaped and that the foil layers that are to be sealed comprise a continuous sheet, which forms a curtain on a side of the fixture that runs parallel to a base leg of the U-shaped slit and from which a packing item is fed into the fixture.

21. Fixture according to claim 12, characterized in that a grounded collector electrode is arranged opposite the plasma nozzle or opposite a movement path of the layers.

6,121,572

7     8

\* \* \* \* \*